United States Patent
Rhu et al.

(10) Patent No.: US 8,603,329 B2
(45) Date of Patent: Dec. 10, 2013

(54) WASTEWATER TREATMENT APPARATUS WITH TWO-STAGE MULTIMEDIA BIOLOGICAL FILTRATION PROCESS

(75) Inventors: Dae Hwan Rhu, Goyang-si (KR); Yeong Ki Yeo, Gunpo-si (KR); Se Wook Seo, Seoul (KR); Yong June Yune, Seoul (KR); Bong Choel Choi, Seongnam-si (KR); Byung Suk Lee, Suwon-si (KR); Hwa Sun Lee, Seoul (KR)

(73) Assignee: Bookang Tech Co., Ltd. (KR)

( * ) Notice: Subject to any disclaimer, the term of this patent is extended or adjusted under 35 U.S.C. 154(b) by 299 days.

(21) Appl. No.: 13/054,413

(22) PCT Filed: Apr. 27, 2009

(86) PCT No.: PCT/KR2009/002177
§ 371 (c)(1),
(2), (4) Date: Apr. 7, 2011

(87) PCT Pub. No.: WO2010/008132
PCT Pub. Date: Jan. 21, 2010

(65) Prior Publication Data
US 2011/0266202 A1    Nov. 3, 2011

(30) Foreign Application Priority Data
Jul. 16, 2008    (KR) .................. 10-2008-0068993

(51) Int. Cl.
- C02F 3/06    (2006.01)
- C02F 3/08    (2006.01)
- C02F 3/30    (2006.01)
- C02F 1/52    (2006.01)
- C02F 101/16  (2006.01)

(52) U.S. Cl.
CPC . *C02F 3/06* (2013.01); *C02F 3/087* (2013.01); *C02F 3/302* (2013.01); *C02F 2203/00* (2013.01); *C02F 1/52* (2013.01); *C02F 2101/16* (2013.01); *Y10S 210/903* (2013.01)
USPC ............................ 210/150; 210/617; 210/903

(58) Field of Classification Search
USPC .......... 210/150, 151, 259, 605, 616, 617, 903
See application file for complete search history.

(56) References Cited

U.S. PATENT DOCUMENTS

| | | | |
|---|---|---|---|
| 4,465,594 A | * | 8/1984 | Laak .............................. 210/151 |
| 5,486,291 A | * | 1/1996 | Todd et al. .................... 210/617 |
| 5,670,046 A | * | 9/1997 | Kimmel ........................ 210/151 |

(Continued)

FOREIGN PATENT DOCUMENTS

| JP | 3555812 B2 | 5/2004 |
|---|---|---|
| KR | 10-0591541 B1 | 6/2006 |
| KR | 10-0794336 B1 | 1/2008 |

*Primary Examiner* — Christopher Upton

(57) ABSTRACT

A wastewater treatment apparatus of the present invention is configured to biologically filter wastewater through multimedia by consecutively performing two stages (the first and second stages) for a multimedia biological filtration process. A carbon source and coagulant are respectively injected during the first and second multimedia biological filtration processes. The first stage multimedia biological filtration process is carried out in anoxic conditions and the second stage multimedia biological filtration process is carried out in aerobic conditions. The media for the first and second stage biological filtration processes are arranged in large-middle-middle large-small size. Thus, the present invention can secure excellent treated water while minimizing loss of water-head by maximizing reflux capability of solids.

2 Claims, 5 Drawing Sheets

(56) References Cited

U.S. PATENT DOCUMENTS

| | | | |
|---|---|---|---|
| 6,083,396 A * | 7/2000 | Payraudeau | 210/150 |
| 6,238,563 B1 * | 5/2001 | Carroll et al. | 210/151 |
| 6,592,761 B2 * | 7/2003 | Wofford | 210/617 |
| 7,022,233 B2 * | 4/2006 | Chen | 210/605 |
| 7,582,474 B2 * | 9/2009 | Lupton | 210/150 |
| 2008/0053897 A1 * | 3/2008 | Zhu et al. | 210/605 |

* cited by examiner

WASTEWATER TREATMENT APPARATUS WITH TWO-STAGE MULTIMEDIA BIOLOGICAL FILTRATION PROCESS

CROSS-REFERENCE TO RELATED APPLICATION

This application is a U.S. National Phase Application of PCT International Application PCT/KR2009/002177, filed Apr. 27, 2009, which claims the benefit under 35 U.S.C. §119(a) of Korean Patent Application No. 10-2008-0068993, filed on Jul. 16, 2008, the disclosure of which is incorporated herein by reference in its entirety.

TECHNICAL FIELD

The present invention relates to an apparatus for treatment of wastewater, and more particularly, to a wastewater treatment apparatus with a multimedia biological filtration process.

BACKGROUND ART

According to application of water quality standards based on total effluent regulations and environmental impact assessment (EIA) systems, current disposal water levels of a sewage treatment plant are strictly controlled. Existing wastewater treatment systems are substantially insufficient to satisfy such levels. Therefore, there is a strong requirement for development into improved biological filtration processes and distribution thereof capable of satisfying desired water quality standards.

A biological filtration process refers to a process of simultaneously performing biological treatment and filtration, in order to attain excellent treatment effects. Compared to a suspended growth process, the biological filtration process may achieve stable treatment efficiencies at relatively high organic loading and hydraulic load. These results are obtained because microorganisms are deposited on a medium and not washed out even when applying a hydraulic load thereto, instead, having a solid content of 1.0 to 4.0 kg/m³ in the medium so as to maintain high concentration of microorganisms.

The solid content of the medium corresponds to 3,000 to 5,000 mg/L in terms of solid content in a reactor used for a suspended growth process, which is substantially similar to the solid content in a reactor for a suspended growth process of 3,500 mg/L. However, solids contained in the medium mostly comprise active microorganisms, thus having activity of 2 to 3 times that of solids generated during the suspended growth process. For this reason, the biological filtration process needs a plant site with considerably decreased area equal to ½ to ⅓ of a site area for establishment of a suspended growth plant.

FIG. 1 shows a typical one-stage single-medium biological filtration process. Such one-stage single-medium biological filtration process encounters rapid head loss when a solid loading is high, requiring frequent backwashing. A load of soluble solids generally ranges from 3 to 4 kgSS/m³/d and, in case of a normal operation, the solids need backwashing once a day. However, this operation may be impaired if a concentration of solids contained in wastewater inflowing to a biological filter ('biofilter') exceeds 100 mg/l. When the solid content of influent water is increased, frequent backwashing is required. However, such a frequent backwashing often causes operation shutdown, increase in backwash water, excessive desorption of microorganisms from the medium which in turn reduces treatment efficiencies, and causes other problems.

FIG. 2 shows a two-stage single-medium biological filtration process disclosed in Korean Patent Registration No. 0817882. Thanks to two stages, more excellent water quality may be accomplished and various operation methods may be embodied. However, when a solid loading is increased, it may cause higher head loss than that generated during one-stage single-medium biological filtration. A medium volume V required for removing pollutants is substantially equal in both the one-stage biological filtration process and the two-stage biological filtration process. However, for one-stage biological filtration, a medium depth H is divided into two equal sections and the lower section (H/2) is operated under anoxic conditions while the upper section (H/2) is operated under aerobic conditions. Therefore, a medium volume of each of the lower and upper sections is ½(V/2). In other words, both these sections have substantially the same medium volume (V=V/2+V/2). In this regard, when the area of a one-stage biofilter is A, a total medium volume may be calculated by the following equation:

$$V_{lower\ (anoxic)} = A \times H/2 = AH/2$$

$$V_{upper\ (aerobic)} = A \times H/2 = AH/2$$

$$V_{total} = V_{lower\ (anoxic)} + V_{upper\ (aerobic)} = AH/2 + AH/2 = AH$$

Herein, a filtering speed LV is defined by flow rate/filtering area (Q/A).

For a two-stage biological filtration process to treat the same wastewater as used in the foregoing one-stage process, a medium volume is substantially identical to that of the one-stage process. However, the filter is divided into two sheets and a volume of one sheet is ½ a volume of the one-stage biofilter.

$$V_{total} = V_{fast\ stage\ (anoxic)} + V_{second\ stage\ (aerobic)} = V/2 + V/2$$

Herein, each of an anoxic bath and an aerobic bath has a medium depth of H, and therefore, one sheet of the two-stage biofilter has an area of ½ the area of the one-stage biofilter.

$$V_{first\ stage\ (anoxic)} = V_{second\ stage\ (aerobic)} = V/2 = H \times A/2 = AH/2$$

This means that a first stage (anoxic) of the two-stage biofilter has a medium volume substantially equal to that of the lower section (anoxic) of the one-stage biofilter whereas a medium depth of the two-stage biofilter is about 2 fold that of the one-stage biofilter, thereby decreasing an area required for filtering to ½ that of the one-stage biofilter. Such decrease in area of the filter results in a 2 fold-increase in a filtering speed when wastewater inflows at the same flow rate of Q. Since head loss is in proportion to the square of flow velocity ($h_L = v^2/2g$), such a head loss may be increased 4 fold if a flow velocity of the two-stage biofilter is 2 fold higher than that of the one-stage biofilter. Accordingly, the two-stage filtration process may ensure high quality of treated water but often encounters a problem of increased head loss. Additionally, a first filter of the two-stage biofilter shows 2-fold increase in solid loading.

Solid loading of a one-stage biofilter (kg$SS$/m²/d)=$SS$ content of water inflow×inflow rate×1/$A$ Solid loading of a first filter among two-stage biofilter (kg$SS$/m²/d)=$SS$ content of water inflow×inflow rate×1/($A$/2)=$SS$ content of water inflow×inflow rate×2/$A$ In order to solve the foregoing problem regarding head loss caused by solid loading, a multimedia biological filtration process as shown in FIG. 3 has been developed (Korean Patent Registration No. 0591541). Such a multimedia biological filtration process may overcome demerits of the single-medium biological filtration process known in the art.

For purpose of applying the foregoing advantages to secure excellent water quality and to treat initial rainwater, a two-stage multimedia-single medium biological filtration process as shown in FIG. 4 was invented (Korean Patent Registration No. 0794336). However, this process entails disadvantages in that head loss rapidly increases due to chemical sludge (solids) formed by a coagulant, if the coagulant is injected into only a second stage to remove phosphorous during filtration and simple multimedia biological filtration is conducted in a first stage. As a result, the previous techniques do not sufficiently utilize a beneficial feature of the multimedia biological filtration process that can prevent head loss as well as a characteristic of the two-stage biological filtration process that achieves high quality of treated water. In spite of the term 'multimedia biological filtration process', the foregoing process substantially consists of two stages and cannot have multiple stages. In fact, when solid loading increases, arranging the media in multi-layers such as large-middle-small size in order may minimize head loss and also secure excellent treated water quality. Moreover, a filtering time is extended which in turn reduces backwashing, thereby decreasing operation costs.

Technical Problem

The present invention is directed to solving conventional problems described above and to realizing beneficial features of a multimedia biological filtration process, and an object of the present invention is to provide a wastewater treatment apparatus used for a biological filtration process, which has advantages of performing a two-stage biological filtration process that attains excellent water quality as well as a multimedia biological filtration process, in addition, may overcome head loss problems in a conventional two-stage multimedia-single medium biological filtration process.

Technical Solution

In order to accomplish the above purpose, an exemplary embodiment of the present invention is to provide a wastewater treatment apparatus which is configured to biologically filter wastewater through multimedia in two stages by comprising consecutive arrangement of a first stage for multimedia biological filtration process and a second stage for multimedia biological filtration process.

In this regard, a submerged medium used in the lower part of the first stage for multimedia biological filtration process has a size of 5 to 20 mm while a suspended medium used in the upper part of the same has a size of 3 to 5 mm Likewise, a submerged medium used in the lower part of the second stage for multimedia biological filtration process has a size of 5 to 10 mm while a suspended medium used in the upper part of the same has a size of 2 to 3 mm. Accordingly, an overall arrangement of media for the first and second stages is formed of large-middle-middle large-small size in sequential order.

Meanwhile, a carbon source and coagulant are injected during the first and second stage biological filtration processes, wherein the first stage multimedia biological filtration process is operated under anoxic conditions while the second stage multimedia biological filtration process is operated under aerobic conditions.

Advantageous Effects

According to the present invention, adopting the same multimedia biological filtration process in both of first and second stages may remove nitrogen, phosphorous and organic materials not only in the first stage but also in the second stage, thereby minimizing head loss while securing excellent treated water. In addition, arranging the media in large-middle-middle large-small size may further minimize head loss, thereby achieving high water quality under optimum operating conditions.

DESCRIPTION OF THE DRAWINGS

The above and other objects, features and other advantages of the present invention will be more clearly understood from the following detailed description taken in conjunction with the accompanying drawings, in which.

BEST MODE

The foregoing technical configurations of the present invention will be more concretely described by the following embodiments.

Figure 1:
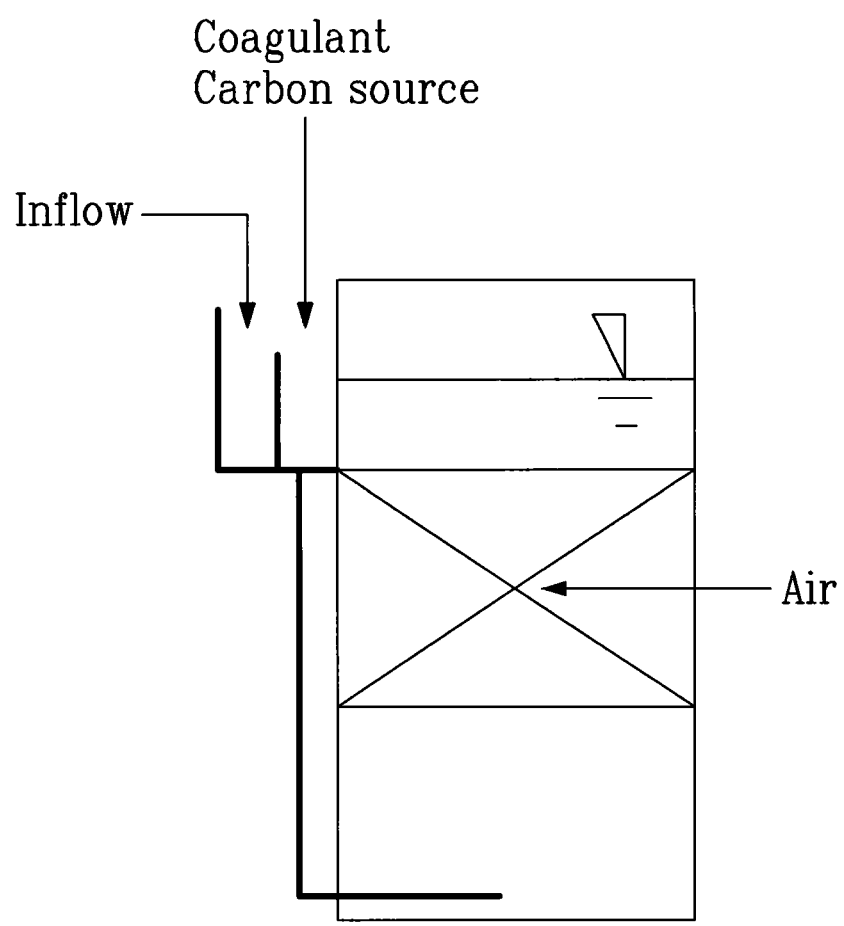
FIG. 1 is a schematic view illustrating an existing one-stage single-medium biological filtration process.
Figure 2:
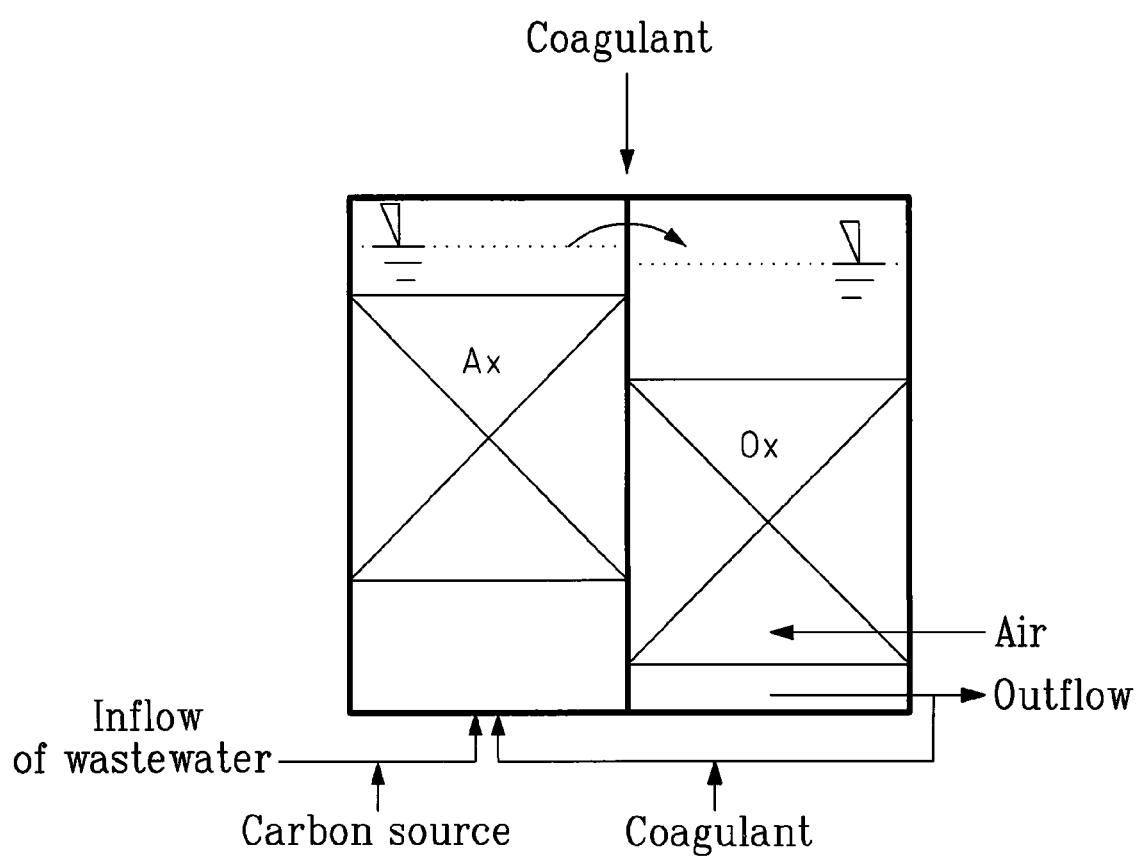
FIG. 2 is a schematic view illustrating an existing two-stage single-medium biological filtration process.
Figure 3:
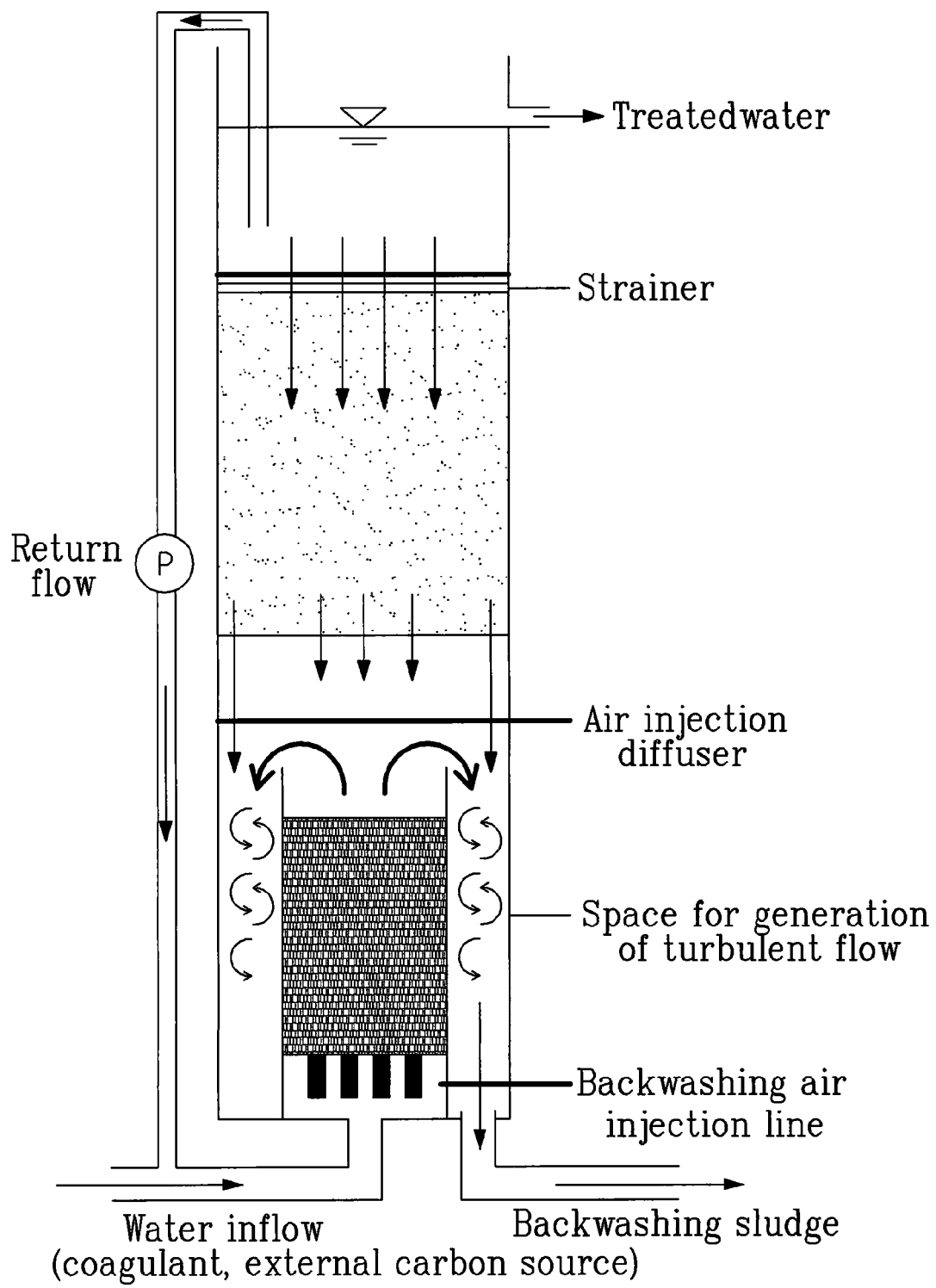
FIG. 3 is a schematic view illustrating an existing one-stage multimedia biological filtration process.
Figure 4:
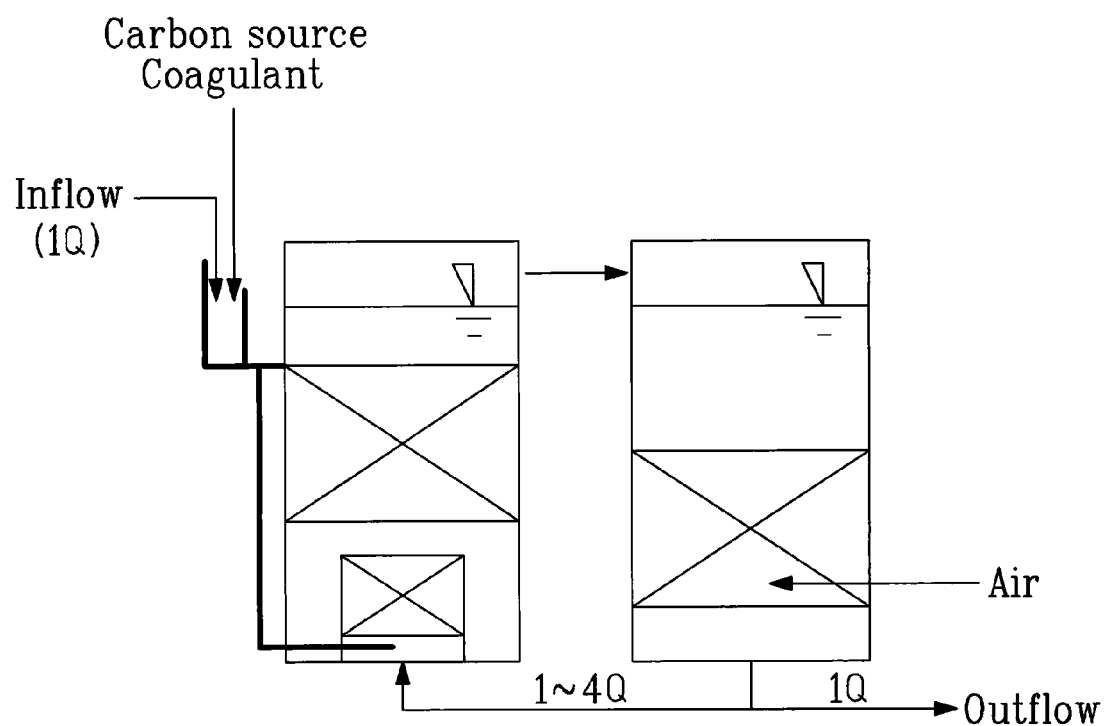
FIG. 4 is a schematic view illustrating an existing two-stage multimedia-single medium biological filtration process.
Figure 5:
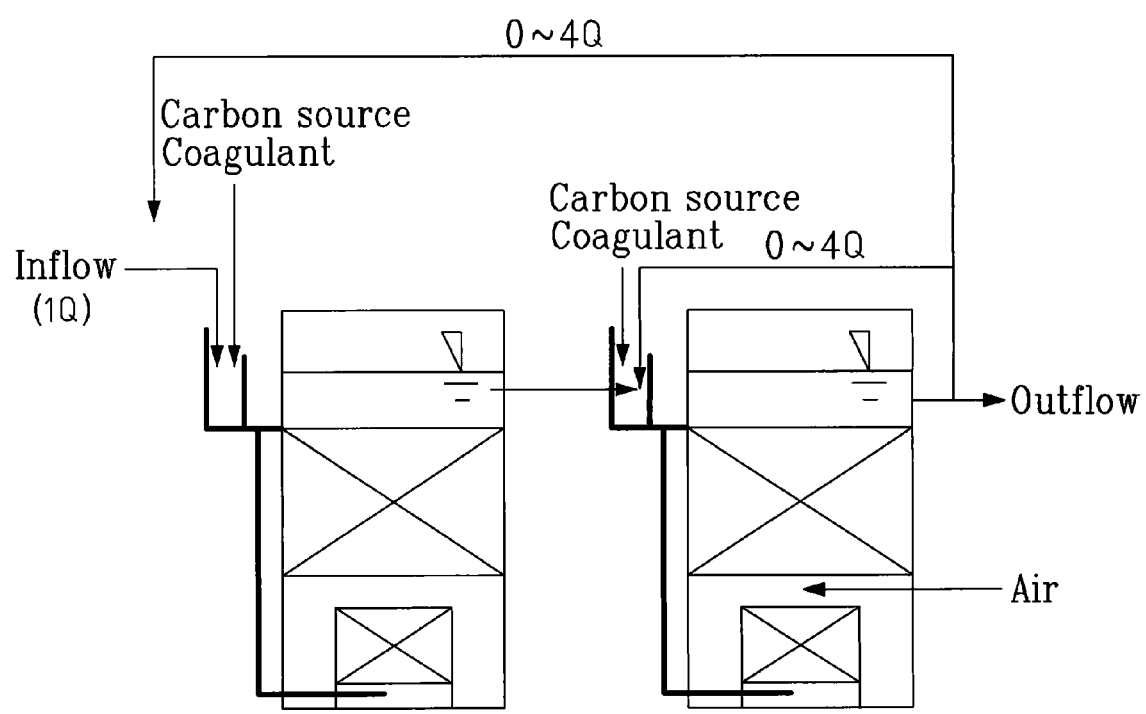
FIG. 5 is a schematic view illustrating a two-stage multimedia-multimedia biological filtration process according to the present invention.

FIG. 5 shows a wastewater treatment apparatus to perform a two-stage multimedia-multimedia biological filtration process according to the present invention.

The inventive wastewater treatment apparatus, as shown in FIG. 5, is configured to perform biological filtration of wastewater through multimedia in two stages by comprising consecutive arrangement of a first stage for multimedia biological filtration process and a second stage for multimedia biological filtration process.

The media used in the wastewater treatment apparatus according to the present invention have decreased sizes in sequential order from a submerged medium used in the lower part of the first stage for multimedia biological filtration process, a submerged medium used in the lower part of the second stage for multimedia biological filtration process, a suspended medium used in the upper part of the first stage and a suspended medium used in the upper part of the second stage for multimedia biological filtration process. More particularly, the submerged medium used in the lower part of the first stage for multimedia biological filtration process has a size of 5 to 20 mm while the suspended medium used in the upper part of the same has a size of 3 to 5 mm. Likewise, the submerged medium used in the lower part of the second stage for multimedia biological filtration process has a size of 5 to 10 mm while the suspended medium used in the upper part of the same has a size of 2 to 3 mm The inventive apparatus may be possibly operated even when solid loading of the second-stage biological filtration process is increased by adding an additional medium in a middle-large size to the second-stage biological filtration process. Forming the overall arrangement of media in large-middle-middle large-small size in sequential order may maximize reflux capability of solids, so as to simultaneously accomplish both purposes of increase in filtering time and excellent quality of treated water.

In this case, a carbon source and coagulant are injected during the first stage multimedia biological filtration process and this process is operated under anoxic conditions to remove nitrogen, phosphorous and organic matters. Likewise, a carbon source and coagulant are also injected during the second stage multimedia biological filtration process and this process is operated by injecting air into the upper part of the second stage to remove nitrogen, phosphorous and organic matters under aerobic conditions.

If an anoxic bath is not partitioned from an aerobic bath, these baths exhibit different operating conditions such as backwash period since the anoxic bath and the aerobic bath are operated under different conditions and have different solid loadings and growth amounts of microorganisms. Accordingly, when the anoxic bath and the aerobic bath are located on a single filter, it is impossible to operate both of the baths under optimum operating conditions thereof. For this reason, in view of treatment efficiencies, it is preferable to separately arrange the anoxic bath and the aerobic bath. However, as described in the background art of this specification, the foregoing arrangement encounters a problem of increased head loss caused by increase in solid loading and hydraulic load. In contrast, the present invention which adopts a consecutive arrangement of media in large (anoxic)-middle (anoxic)-middle large (anoxic)-small (aerobic) size may minimize head loss, although having a two-stage configuration to embody optimum operating conditions.

According to the present invention, nitrogen, phosphorous and organic matters are continuously removed, in turn resulting in superior quality of treated water. In addition, since solids are removed using a medium in the lower part of the apparatus, the solid loading of a medium in the upper part of the apparatus is reduced which in turn minimizes the head loss, thus extending the filtering time.

After completing wastewater treatment using the wastewater treatment apparatus of the present invention, the treated water showed improved BOD and SS of less than 3.0 mg/L, T-N of less than 3.0 mg/L and T-P of less than 0.1 mg/L, thereby demonstrating excellent water quality.

The wastewater treatment apparatus of the present invention may have various advantages of securing high water quality through two-stage biological filtration and having favorable effects of multimedia biological filtration, in addition, enable performance of an improved biological filtration process to overcome head loss problems of conventional two-stage multimedia-single medium biological filtration methods, thereby providing high quality treated water.

The invention claimed is:

1. A wastewater treatment apparatus capable of performing biological filtration of wastewater through multimedia in two stages by comprising consecutive arrangement of a first stage for multimedia biological filtration process and a second stage for multimedia biological filtration process,
   wherein the media used herein have decreased sizes in consecutive order from a submerged medium used in the lower part of the first stage for multimedia biological filtration process, a submerged medium used in the lower part of the second stage for multimedia biological filtration process, a suspended medium used in the upper part of the first stage for multimedia biological filtration process and a suspended medium used in the upper part of the second stage for multimedia biological filtration process.

2. The apparatus according to claim 1, wherein the submerged medium used in the lower part of the first stage for multimedia biological filtration process has a size of 5 to 20 mm while the suspended medium used in the upper part of the first stage has a size of 3 to 5 mm, and the submerged medium used in the lower part of the second stage for multimedia biological filtration process has a size of 5 to 10 mm while the suspended medium used in the upper part of the second stage has a size of 2 to 3 mm.

* * * * *